Aug. 16, 1960
E. S. McVEY
2,949,546
VOLTAGE COMPARISON CIRCUIT
Filed Dec. 9, 1957
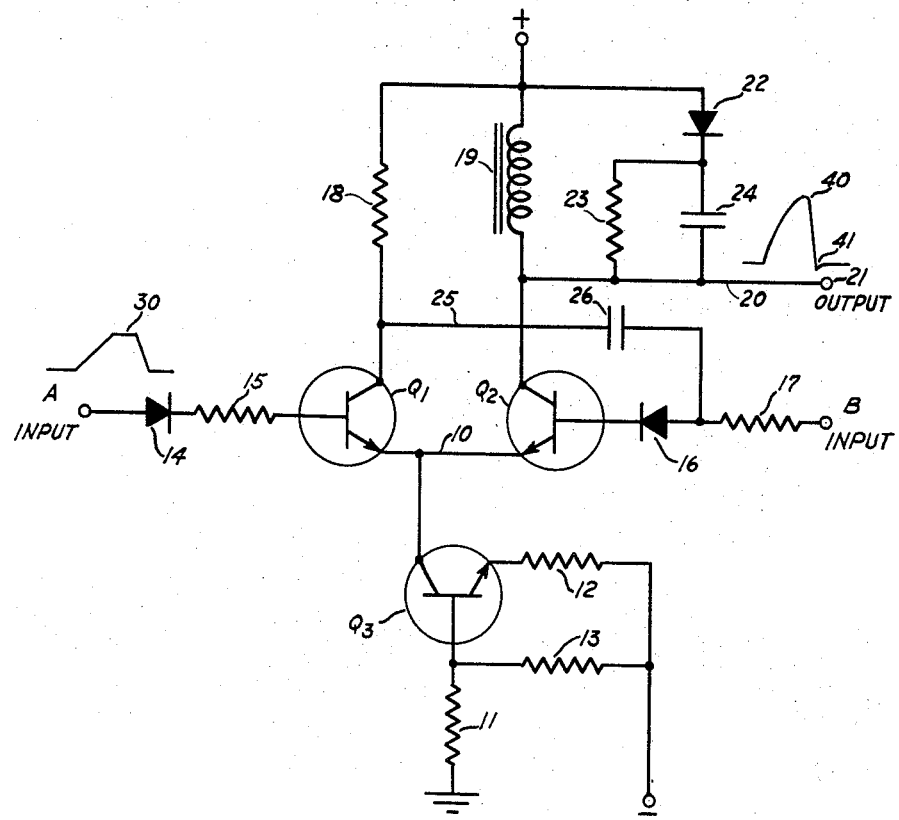
INVENTOR.
EUGENE S. MCVEY
BY
H. W. Losche
ATTORNEYS

United States Patent Office 2,949,546
Patented Aug. 16, 1960

2,949,546
VOLTAGE COMPARISON CIRCUIT

Eugene S. McVey, Lafayette, Ind., assignor to the United States of America as represented by the Secretary of the Navy Filed Dec. 9, 1957, Ser. No. 701,684
4 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This invention relates to a voltage comparison circuit of the "multiar" type for voltage amplitude comparison and more particularly to a voltage comparison circuit utilizing semi-conductor devices for receiving two separate input voltages for comparison and for producing an output signal upon a predetermined voltage amplitude relationship of the compared voltages.

Voltage comparison circuits utilizing vacuum tubes are well known and have been operating successfully for a number of years. Some of the disadvantages of the vacuum tube circuits are that considerable space and weight are required for the vacuum tube circuits and such vacuum tube circuits are only as reliable as the vacuum tubes therein, which vacuum tubes are normally quite delicate by reason of their glass envelopes and various grid and electrode structures. Dissipation of heat is also a factor to be considered when using thermionic tubes in vehicles where space is at a premium and ventilation is poor. Where the applications for using such vacuum tube circuits are in aircraft components and equipment, the space and weight problem becomes one of considerable concern since the use of more and more equipment is necessary in modern aircraft. In combat aircraft it is essential that all material carried in the aircraft be maintained at an absolute minimum.

In the present invention the voltage comparison circuit constructed using semi-conductors requires very little space, is light in weight, and is quite suitable for aircraft, whether or not used together with other semi-conductor components. The present invention, of course, is normally used with other components and is particularly adapted for use in a radar ranging system, or the like, where a range scanning voltage may be compared in the circuit of this invention with a range reference voltage to produce pulses operative through blocking oscillators or other wave-shaping devices to trigger gating circuits of such a system. While this invention is particularly adaptable for such use, it is to be understood that it may have many general applications. It is therefore a general object of this invention to provide a simple and reliable amplitude voltage comparison circuit utilizing semi-conductors without the aid of any vacuum tubes to compare the amplitude of two voltages, a predeterminded comparison point thereof producing a signal for operational use.

These and other objects, advantages, features, and uses may become more apparent as the description proceeds when considered along with the accompanying drawing showing a single schematic wiring diagram of the preferred form of this invention.

Referring more particularly to the figure illustration, there is shown a pair of semi-conductors $Q_1$ and $Q_2$ and a third semi-conductor $Q_3$, all of which may be of a triode type of transistor which is well known and understood in the art. While the three semi-conductors or transistors are shown as being of the N-P-N type, it is to be understood that a circuit arrangement could be devised readily in light of applicant's description and illustration to utilize P-N-P type transistors by reversing and rearranging the polarities. The emitters of transistors $Q_1$ and $Q_2$ are coupled in common through the conductor 10, and this common coupling of the emitters is connected to the collector of transistor $Q_3$. The transistor $Q_3$ is used as a constant current source for the emitters of transistors $Q_1$ and $Q_2$. The voltage divider consisting of resistors 11 and 13 applies a fixed negative bias on the base of transistor $Q_3$ from a negative potential source. This negative bias permits the collector potential of transistor $Q_3$ to go above or below ground so that the voltage input at B may go to zero. The base bias potential on transistor $Q_3$ and emitter circuit resistor 12 determine the current in the collector circuit of transistor $Q_3$ virtually independent of the collector voltage.

The base of each transistor $Q_1$ and $Q_2$ is coupled respectively to input terminals A and B through a unidirectional means and a resistance 14, 15, and 16, 17, respectively, the unidirectional means being diodes or other rectifying means, particularly of the solid state type. The collectors of the transistors $Q_1$ and $Q_2$ are each coupled to a positive voltage source through a load, the collector of transistor $Q_1$ being coupled to the positive voltage source through a resistor 18 and the collector of the transistor $Q_2$ being coupled to the positive voltage source through an inductance 19. The collector of the transistor $Q_2$ is coupled through an output circuit represented by the conductor 20 to an output terminal 21. In parallel with the inductance 19 is a network including a diode 22 in series with a parallel coupled resistance 23 and capacitor 24 providing a means for eliminating negative signals which might occur on the output conductor 20. The diode 22 is oriented in the low resistance direction from the positive supply source to the parallel network 23, 24. A feedback circuit is provided between the collector of transistor $Q_1$ and the base of transistor $Q_2$ through a conductor 25 having a capacitor 26 therein to provide a positive feedback causing a snap action in the change of conduction from the transistor $Q_2$ to the conduction in transistor $Q_1$.

The circuit is designed somewhat symmetrically to avoid the necessity of incorporating additional compensating circuitry. For example, the resistor 17 is necessary to keep the source of the voltage input at the terminal B from shorting out the feedback path. The resistor 15 is added to maintain symmetry in the two input circuits of transistors $Q_1$ and $Q_2$. The feedback to the base of $Q_2$ is connected at the terminal of the diode 16 and the resistor 17 to allow only negative going pulses from the feedback circuit to be applied to the base of transistor $Q_2$. The capacitor 26 blocks the application of the reference voltage applied at terminal B from the collector of transistor $Q_1$. The collector current of the transistor $Q_3$ will always be equal to the combined currents through the emitters of the transistors $Q_1$ and $Q_2$ by reason of the emitter and base couplings of transistor $Q_3$ regardless of whether voltage variations occur at the emitters of transistors $Q_1$ and $Q_2$.

In the operation of the voltage comparison circuit let it be assumed that a ramp function voltage is applied to terminal A, as from a radar scanning device or the like, and that a fixed reference positive voltage is applied to the terminal B, as from a radar range setting or the like, for the purpose of amplitude voltage comparison. Considering the circuit at the very beginning of the ramp function voltage applied to terminal A, the reference voltage applied to terminal B will be above that voltage applied at terminal A, producing a potential on the base of transistor $Q_2$ at a higher level than the base voltage on the transistor $Q_1$. This voltage relationship causes conduction through the emitter and collector of transistor $Q_2$ and nonconduction of transistor $Q_1$. The conduction of the transistor $Q_2$ produces a current through the inductance load 19, the collector and emitter of transistor $Q_2$, the conductor 10, the collector and emitter of transistor $Q_3$, and the resistor 12 to the negative fixed potential. Since the current passing through the above elements will be substantially constant, the voltage level on the output conductor 20 will be constant. Let it be assumed that a ramp function voltage is applied to the terminal A, as illustrated by the voltage wave 30. When the amplitude of this ramp function voltage applied to the base of transistor $Q_1$ equals or exceeds the reference voltage applied to the base of transistor $Q_2$, transistors $Q_1$ and $Q_2$ will switch in conduction phase, now producing a current flow through the load resistor 18, the collector and emitter of transistor $Q_1$, the conductor 10, the collector and emitter of the transistor $Q_3$, and the resistance 12 to the negative voltage supply. The initial conduction of transistor $Q_1$ produces a voltage drop across resistor 18 and therefore a rapid voltage drop on the collector to impress a negative going pulse through the feedback circuit 25 to the base of transistor $Q_2$ although this feedback voltage remains of positive polarity with respect to the emitters. The feedback of the negative going pulse resulting from the initial conduction through the transistor $Q_1$ through the conductor 25 and capacitor 26 to the base of transistor $Q_2$ provides a snap action which enables the transistors $Q_1$ and $Q_2$ to switch conduction in an almost instantaneous manner. The switching of conduction from the transistor $Q_2$ to the transistor $Q_1$ produces a collapse of the magnetic field in the inductance load 19, thereby producing a positive pulse on the output conductor 20 to the output terminal 21 of a wave form illustrated by 40. Any tendency to produce a negative swing on the trailing edge of the wave 40, as illustrated at 41, is substantially eliminated by the series parallel network consisting of the elements 22, 23, and 24. In this manner the amplitude of two voltages may be compared, the point of comparison being detected by a voltage wave produced on the collector of transistor $Q_2$ as the result of the collapse of the magnetic field in the collector load circuit.

While the operation of the preferred form of the invention is made, by way of example, using one ramp function voltage and one fixed amplitude voltage, it is to be understood that the two voltages to be compared and applied to the input terminals A and B may be both variable or varying where the comparison of such voltages is desired. It is likewise to be understood that the preferred form of the circuit illustrated could use either transistors of the N-P-N or the P-N-P types by proper polarity arrangement and that the voltage comparison circuit may be readily adaptable to compare the amplitude of negative swinging voltages and to produce negative output voltage wave signals where such are desirable.

While many modifications and changes may be made in the constructional arrangement and features of this invention without departing from the spirit and scope of the inventive concept, I desire to be limited only in the scope of the appended claims.

I claim:
1. A voltage comparison circuit comprising: a pair of semi-conductors each having base, collector, and emitter electrodes, said base electrodes each being coupled to an input through unidirectional means oriented with the low forward resistance looking into the base electrode, and said emitters being coupled; a third semi-conductor having base, emitter, and collector electrodes, said collector and emitter being coupled across the emitter coupling of said pair of semi-conductors and a biasing potential, and said base electrode being biased; a collector potential source coupled to said collectors of said pair of semi-conductors through loads, one of the pair of said semi-conductor collectors being coupled to an output and the load of said one having a means in parallel therewith to eliminate negative signals at the output; and a feedback circuit, having a capacitor therein, between the other of said pair of semi-conductor collectors and the base of the one semi-conductor for providing rapid switch of conduction between said pair of semi-conductors whereby said pair of semi-conductors will switch conduction upon a predetermined relationship of like polarity voltages applied to said inputs to produce a signal on the output, the conduction current being controlled by the third semi-conductor.

2. A voltage comparison circuit comprising: a pair of semi-conductors each having base, collector, and emitter electrodes, said base electrodes each being coupled to an input through unidirectional means oriented with the low forward resistance looking into the base electrode, and said emitters being coupled together; a third semi-conductor having base, emitter, and collector electrodes, said collector and emitter being coupled across the emitter coupling of said pair of semi-conductors and a biasing potential, and said base electrode being biased; a collector potential source coupled to the collector of one of the pair of said semi-conductors through a load inductance and to the collector of the other of the pair of said semi-conductors through a resistance load, said one of the pair of said semi-conductor collectors being coupled to an output, and said inductance load having a means in parallel therewith to eliminate negative signals at the output; and a feedback circuit capacitor coupled between the collector of the other of said pair of semi-conductors and the base of the one semi-conductor of said pair for providing rapid switch of conduction between said pair of semi-conductors whereby said pair of semi-conductors will switch conduction upon a predetermined relationship of like polarity voltages applied to said inputs to produce a signal on the output, the conduction current being controlled by the third semi-conductor.

3. A voltage comparison circuit as set forth in claim 2 wherein said inputs are adapted to receive two variable voltages to be compared through said unidirectional means to said bases thereby determining the conduction of either of said pair of semi-conductors.

4. A voltage comparison circuit comprising: a pair of three-electrode transistors each having the base electrode coupled through a resistance and a unidirectional means oriented with the low forward resistance looking into the base electrode to an input terminal for receiving two separate voltages of the same polarity to be compared; a third transistor having its collector coupled in common to the emitters of said pair of transistors and its emitter coupled through resistance to a negative potential source; a positive potential source coupled through loads to each collector of said pair of transistors, the load in the coupling to one of said pair of transistors being a resistance and the load in the coupling to the other of said pair being an inductance in parallel with a negative signal eliminating network; a feedback circuit coupling the collector of said one transistor with the base of the other transistor through a capacitance; and an output lead coupled to the collector of said other transistor whereby the transistor of said pair having the higher voltage on the base thereof being conductive, the conduction being switched when this base voltage is exceeded to produce a voltage signal on said output.

References Cited in the file of this patent
UNITED STATES PATENTS 2,814,736    Hamilton _____ Nov. 26, 1957
2,892,953    McVey _____ June 30, 1959

OTHER REFERENCES

Wolfendale et al.: "The Junction Transistor as a Computing Element," pages 83–87, Electronic Engineering, February 1957.